United States Patent [19]

Aoki

[11] 4,178,893

[45] Dec. 18, 1979

[54] IGNITION CONTROL APPARATUS FOR AN INTERNAL COMBUSTION ENGINE

[75] Inventor: Keiji Aoki, Susono, Japan

[73] Assignee: Toyota Jidoshi Kogyo Kabushiki Kaisha, Aichi, Japan

[21] Appl. No.: 874,756

[22] Filed: Feb. 3, 1978

[30] Foreign Application Priority Data

Jul. 19, 1977 [JP] Japan .................................. 52-08556

[51] Int. Cl.² .............................................. F02P 5/04
[52] U.S. Cl. ......................... 123/117 D; 123/179 BG
[58] Field of Search .......... 123/117 D, 117 R, 32 EB, 123/179 BG

[56] References Cited

U.S. PATENT DOCUMENTS

3,916,855  11/1975  Fauser ............................. 123/117 R

*Primary Examiner*—Ronald B. Cox
*Attorney, Agent, or Firm*—Stevens, Davis, Miller & Mosher

[57] ABSTRACT

Disclosed is an ignition control apparatus for controlling the ignition timing of spark plugs mounted in an internal combustion engine. The ignition control apparatus includes a C-MOS type electrical circuit for generating a control signal of the spark plugs based on a fixed spark-advance angle. At the time when the engine is started, the control signal provided from the C-MOS type electrical circuit is used for controlling the ignition timing of the spark plugs.

4 Claims, 7 Drawing Figures

IGNITION CONTROL APPARATUS FOR AN INTERNAL COMBUSTION ENGINE

BACKGROUND OF THE INVENTION

The present invention relates to an ignition control apparatus for an internal combustion engine. More particularly, the invention relates to an electrical ignition control apparatus which has an electrical circuit to which a fixed D.C. voltage should be supplied as a voltage supply.

In electrical ignition control apparatuses for internal combustion engines, a calculation of the ignition timing is performed based on signals indicating conditions of the engine, for example, an air flow signal for indicating a quantity of air sucked into the engine or a vacuum level signal for indicating the vacuum level in an intake manifold of the engine and a rotational speed signal for indicating the rotational speed of the engine. Thereafter, the timing of sparks produced by spark plugs mounted on cylinders of the engine is controlled according to the results of the above-mentioned calculations.

An ignition control apparatus of this type comprises, in general, a digital electronic circuit such as a microprocessor and a digital memory element. In order to actuate and operate this digital electronic circuit, a fixed D.C. voltage supply, for example, a 5-V D.C. supply, is necessarily required. In the case of an automobile internal combustion engine, an automobile battery is ordinarily used as the power supply source for an electronic circuit of this type. The terminal voltage of this automobile battery, however, changes greatly depending on the driving condition of the engine. Especially at the time of starting the engine, a large current flows into a starter motor and variation of the voltage is extreme. When the temperature of the outer atmosphere is low or the battery is degraded, the terminal voltage of the battery is often lower than 5 V at the time of starting the engine.

Accordingly, in a conventional control apparatus of this type, the occurrence of trouble in the above-mentioned electronic circuit at the time of starting the engine or during the driving operation is prevented by elevating the battery voltage by using a D.C. converter, adjusting the elevated voltage to a predetermined fixed voltage and finally supplying the fixed voltage to the electronic circuit. However, since this D.C. converter is very expensive and large in volume, installation of the D.C. converter on an automobile involves problems of cost, space and the like.

SUMMARY OF THE INVENTION

It is therefore an object of the present invention to provide an ignition control apparatus by which the ignition timing can be conveniently controlled at the time of starting the engine without using a D.C. converter.

According to the present invention, an ignition control apparatus for an internal combustion engine comprises a signal generating means for generating electrical signals which indicate the conditions of the engine, a first electrical circuit for calculating the ignition timing of each of the spark plugs mounted on the cylinders of the engine in response to the value of the electrical signals and for generating a control signal based on the calculated ignition timing, a second electrical circuit for generating a control signal based on the ignition timing of a fixed spark-advance angle, the second electrical circuit consisting of a C-MOS type electrical circuit, a third electrical circuit for controlling the timing of sparks produced by the spark plugs in response to the value of a control signal provided from the first electrical circuit or the second electrical circuit, and a switching means which is changed over and controlled so that the control signal provided from the second electrical circuit is applied to the third electrical circuit at the time of starting the engine.

In a preferred embodiment, the first electrical circuit comprises a digital computer programmed to calculate the ignition timing from an algebraic function or functions describing a desired relationship between the conditions of the engine and the ignition timing.

In another preferred embodiment, an electrical power input terminal of the second electrical circuit is connected directly to a battery of the engine.

In still another preferred embodiment, the second electrical circuit comprises a C-MOS type down counter for counting a number of applied clock pulses whose frequency is proportional to the rotational speed of the engine, a preset value of the down counter being controlled to a predetermined value, and a C-MOS type flip-flop for controlling the counting operation time of the down counter.

The above and other related objects and features of the present invention will be apparent from the following description of the disclosure with reference to the accompanying drawings and also from the appended claims.

DETAILED DESCRIPTION OF THE INVENTION

Figure 1:
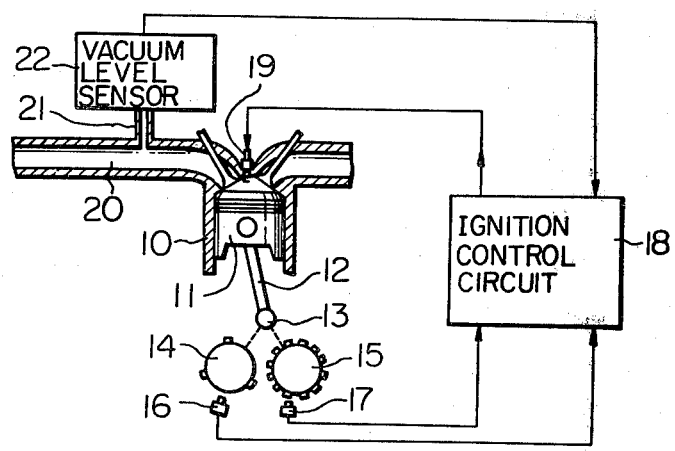
FIG. 1 is a schematic view of an internal combustion engine to which an ignition control apparatus according to the present invention is attached.

Referring to FIG. 1, which is a schematic view illustrating the outline of an internal combustion engine to which the apparatus of the present invention is applied, a piston 11 in a cylinder 10 is connected to a crankshaft 13 through a connecting rod 12. Rotating discs 14 and 15 composed of a magnetic material such as iron are connected to the crankshaft 13 so that the discs 14 and 15 are rotated together with the crankshaft 13. Projections are formed on the periphery of the disc 14 at intervals of, for example, 120°, and projections are formed on the periphery of the disc 15 at intervals of, for example 10°. Magnetic pick-up transducers 16 and 17 are disposed in the vicinity of the peripheries of the discs 14 and 15, respectively. Accordingly, magnetic fluxes in magnetic circuits of the magnetic pick-up transducers 16 and 17 change at points of the respective projections of the discs 14 and 15; therefore, pulses are generated at points of the respective projections of the discs 14 and 15, namely at every one of the crank angles of 120° and 10°. These pulses are supplied to an ignition control circuit 18. A spark plug 19 is disposed in the head portion of the cylinder 10 so that when it is energized, it ignites fuel in the cylinder 10, and the spark plug 19 is electrically connected to the ignition control circuit 18. An intake manifold 20 is connected to the cylinder 10 through an intake port, and a vacumm level sensor 22 is connected to the intake manifold 20 through a conduit 21. This vacuum level sensor 22 is a known sensor capable of sensing a vacuum level in the intake manifold 20 and of providing an estimated value of the load on the engine. A detection signal based on this estimated value is digitalized and applied to the ignition control circuit 18.

Figure 2:
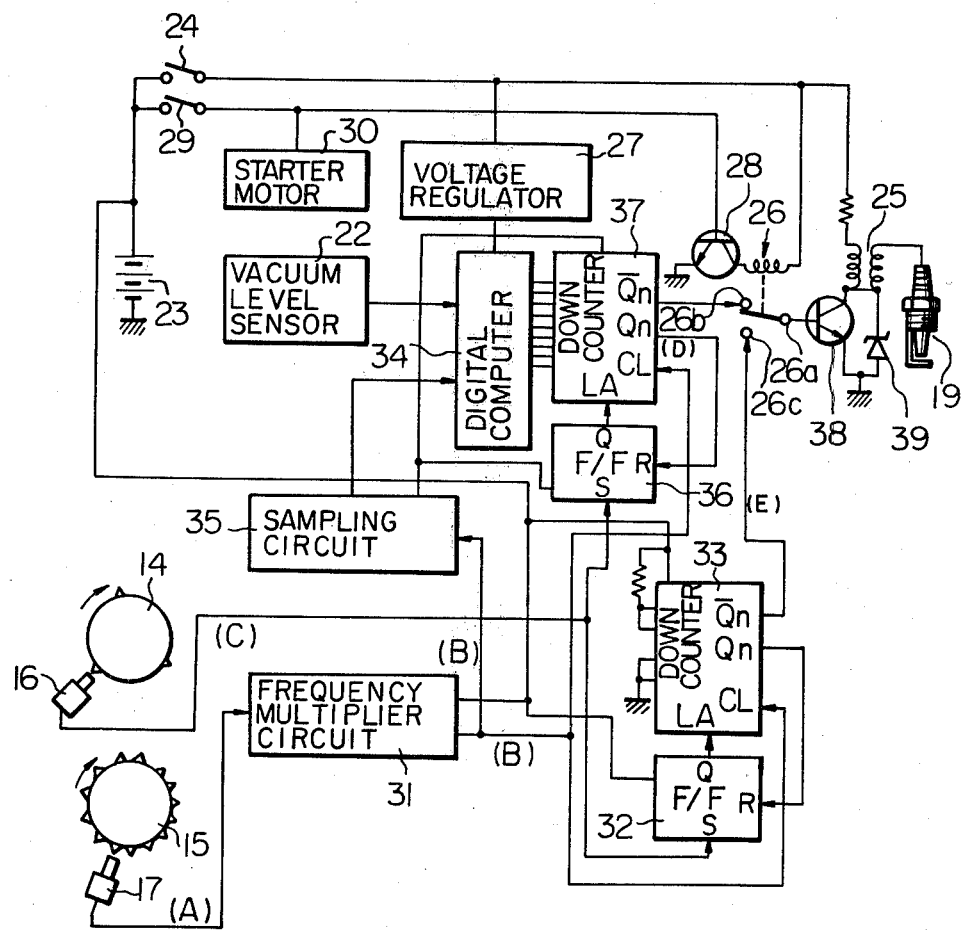
FIG. 2 is a block diagram of an ignition control circuit in an embodiment of the present invention.

FIG. 2 is a block diagram illustrating in detail the ignition control circuit 18 shown in FIG. 1. In both FIGS. 1 and 2, the same members are represented by the same reference numerals.

As shown in FIG. 2, one terminal of a battery 23 is grounded and the other terminal thereof is connected to a primary winding of an ignition coil 25 through an ignition switch 24 and further connected to an exciting coil of an electromagnetic relay 26 and of a voltage regulator 27. The other end of the above exciting coil is grounded through a transistor 28. The other terminal of the battery 23 is connected to a starter motor 30 through a starter switch 29 and further to a control terminal of the transistor 28. Furthermore, the other terminal of the battery 23 is directly connected to power input terminals of a frequency multiplier circuit 31, an R-S flip-flop 32 and a down counter 33.

The output terminal of the voltage regulator 27 consisting of a simple combination of elements, such as a zener diode and a resistor, is connected to power input terminals of a digital computer 34 comprising a microprocessor, a semiconductor memory element, a logical gate element, etc. (not shown), a sampling circuit 35, an R-S flip-flop 36 and a down counter 37.

The secondary winding of the ignition coil 25 is connected to the spark plug 19, and a common connection terminal of the primary and secondary windings of the ignition coil 25 is grounded through a transistor 38 and a zener diode 39 protecting the transistor 38.

Each of the magnetic pick-up transducers 16 and 17 is a common magnetic transducer comprising a permanent magnet and a coil combined so as to form a magnetic circuit, and the transducers 16 and 17 are arranged so that when the projections of the discs 14 and 15 approach close to the above magnetic circuits, magnetic fluxes are changed to generate voltages. The output terminal of the magnetic pick-up transducer 16 is connected to the set input terminals of the R-S flip-flops 32 and 36. The output terminal of the magnetic pick-up transducer 17 is connected to the signal input terminal of the frequency multiplier circuit 31. Circuits for rectifying wave-forms of output signals are disposed with output terminals of the magnetic pick-up transducers 16 and 17 according to need.

Figure 3:
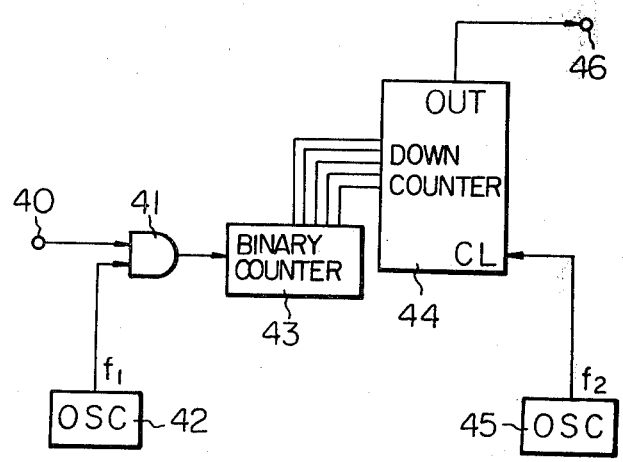
FIG. 3 is a block diagram of a part of the ignition control circuit shown in FIG. 2.

The frequency multiplier circuit 31 is made of a C-MOS (complementary metal oxide semiconductor) and has a circuit structure as shown, for example, in FIG. 3. In this circuit, a signal to be multiplied, which is applied to an input terminal 40, is used as a gate control signal for an AND gate 41. A pulse signal supplied from an oscillating circuit 42, which has a frequency $f_1$ which is much higher than the frequency of the signal to be multiplied, is applied to the AND gate 41. Accordingly, pulse signals whose total number corresponds to the frequency of the signal to be multiplied pass through the AND gate 41, and are applied to a binary counter 43 and counted thereby. Results of the counting by the binary counter 43 are set in the down counter 44. Accordingly, this down counter 44 performs a counting-down process in response to a pulse signal supplied from an oscillating circuit 45. Accordingly, if a relation of $f_2=20f_1$ is established between the frequency $f_1$ of the pulse signal supplied from the oscillating circuit 42 and the frequency $f_2$ of the pulse signal supplied from the oscillating circuit 45, a signal having a frequency 20 times as high as the frequency of the input signal appears on the output terminal 46 of the multiplier circuit 31. In the instant embodiment, the multiplier circuit 31 multiplies the frequency by 20 times.

The output terminal of the frequency multiplier circuit 31 is connected to clock input terminals CL of the down counters 33 and 37 and further to the signal input terminal of the sampling circuit 35.

The sampling circuit 35 comprises a binary counter being made of a bipolar semiconductor, a P-type MOS or an N-type MOS, an AND gate and an oscillating circuit. The sampling circuit 35 counts the number of pulse signals which are applied for a predetermined time. The output signal of the sampling circuit 35 and the output terminal of the above-mentioned vacuum level sensor 22 are connected to the data input terminal of the digital computer 34.

The digital computer 34 is a so-called micro-computer including a micro-processor, a semiconductor memory element, a logical gate element and the like, and the digital computer 34 is made of a bipolar semiconductor, a P-type MOS or an N-type MOS.

The output terminal of the digital computer 34 is connected to the set value input terminal of the down counter 37, the inverting output terminal $\overline{Q}n$ of the down counter 37 is connected to one fixed contact 26b of the electromagnetic relay 26 and the non-inverting output terminal Qn is connected to a reset input terminal of the R-S flip-flop 36. The output terminal of the R-S flip-flop 36 is connected to a latch terminal LA for controlling the operation of the counting operation of the down counter 37. Each of the down counter 37 and R-S flip-flop 36 is made of a bipolar semiconductor, a P-type MOS, an N-type MOS or the like.

Each of the down counter 33 and the R-S flip-flop 32 is formed of a C-MOS. The inverting output terminal $\overline{Q}n$ of the down counter 33 is connected to the other fixed contact 26c of the electromagnetic relay 26, and the non-inverting output terminal Qn is connected to the reset input terminal of the R-S flip-flop 32. The set value input terminal of the down counter 33 is connected to a power source circuit and to a grounded circuit so that a set value is controlled to a predetermined value. The output terminal Q of the R-S flip-flop 32 is connected to a latch terminal LA for controlling the counting operation of the down counter 33.

The electromagnetic relay 26 is arranged so that a movable contact 26a falls in contact with the fixed contact 26b when the relay 26 is deenergized and that the movable contact 26a falls in contact with a fixed contact 26c when the relay 26 in energized. The movable contact 26a is connected to the control input terminal of the transistor 38.

The operation of the apparatus of the present invention having the above-mentioned structure will now be described with reference to the wave-form diagram of FIG. 4.

When the engine is operating normally, the ignition switch 24 is kept closed and the starter switch 24 is kept opened. Accordingly, in this case, the transistor 28 becomes non-conductive and the electromagnetic relay 26 is deenergized. As a result, the signal for switching and for controlling the transistor 38 and thus for controlling the ignition timing is supplied from the down counter 37.

The normal operation of the engine will now be described. Every time the crankshaft turns by 10°, a pulse signal [shown in FIG. 4-(A)] is generated in the magnetic pick-up transducer 17. This pulse signal is applied to the frequency multiplier circuit 31 and multiplied by 20 times. Accordingly, the pulse signal [shown in FIG. 4-(B)] which is provided from the frequency multiplier circuit 31 is generated at an interval corresponding to a 0.5° crank angle. This output pulse signal of the multiplier circuit 31 is applied as a clock pulse to the sampling circuit 35 and to down counters 37 and 33. In the sampling circuit 35, the clock pulses are counted for a predetermined duration of time. Accordingly, the counted value is proportional to the rotational speed of the engine. This rotational speed signal is applied to the digital computer 34. The vacuum level sensor 22 generates a digital signal indicating the vacuum level in the intake manifold 20 of the engine. Furthermore, this vacuum level signal is applied to the digital computer 34.

The digital computer 34 calculates the ignition timing, or the spark-advance angles from the applied rotational speed signal and from the vacuum level signal. Calculation of this type is performed according to a program stored in the digital computer 34. This technique is known from, for example, U.S. Pat. No. 3,969,614.

Procedures of this calculation will now be briefly described hereinafter.

Figure 5A:
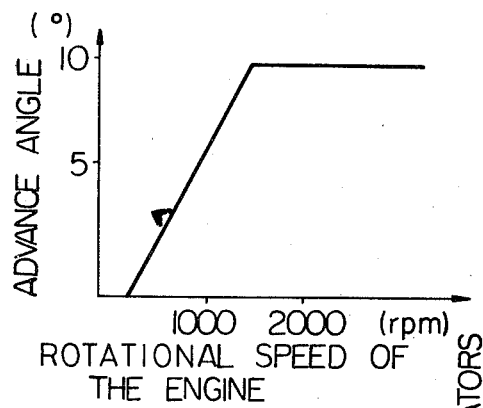
FIGS. 5a and 5b are, respectively, graphs of ignition timing characteristics.
Figure 5B:
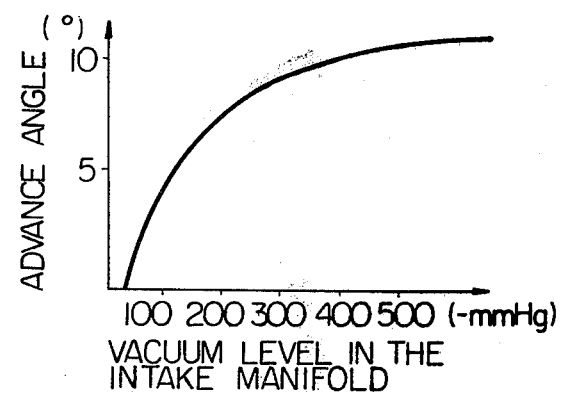

Functions as shown in FIG. 5-a or 5-b are stored in the form of an approximation formula or in the form of sequential data in the memory element of the digital computer 34. Accordingly, spark-advance angles can readily be obtained from the rotational speed signal and the vacuum level signal, respectively, in the computer. These spark-advance angles are added together to obtain the spark-advance angle of the engine. A signal indicating this spark advance angle is fed to the down counter 37 and set therein. For example, when the spark-advance angle is calculated as 20°, the value actually applied to and set in the down counter 37 is 200 [=(120°−20°)/0.5°] because the ignition timing standard point, namely the top dead center (T.D.C.) of the compression stroke, appears at every 120° in the case of a four cycle six-cylinder engine. It must be noted, however, that the above-mentioned relationship is applicable where clock pulses of the down counter 37 have a frequency corresponding to a 0.5° crank angle.

Figure 4:
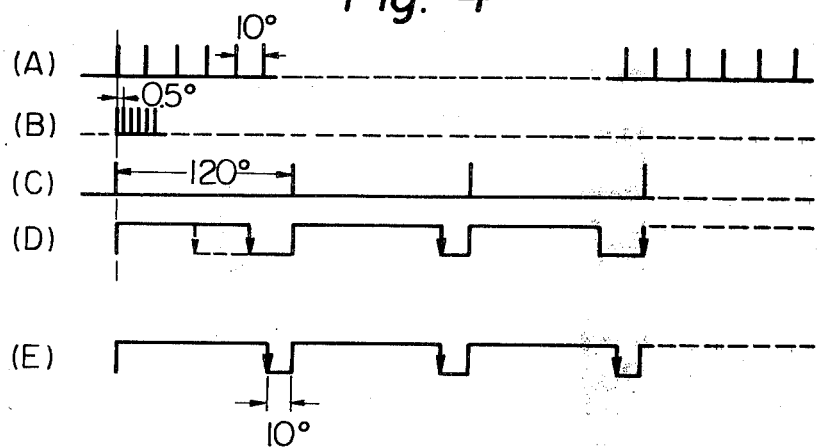
FIG. 4 shows five wave-forms obtained at various points in the circuit shown in the block diagram of FIG. 2.

Separately, a pulse signal [shown in FIG. 4-(C)] is provided from the magnetic pick-up transducer 16 every time the crankshaft turns by 120°. The transducer 16 is arranged so that such pulse signal is generated in correspondence to the time when the piston in each cylinder of the engine reaches the top dead center. Namely, in case of a four-cycle six-cylinder engine, the above pulse signal is generated at every 120°. This pulse signal is applied to the set input terminals S of the R-S flip-flops 36 and 32, and these flip-flops are thus set. When the flip-flops 36 and 32 are thus set, since a high level signal is applied to the latch terminal LA of each of the down counters 37 and 33, the down counters 37 and 33 will accordingly begin the counting operation. During the counting operation, high level signals appear at the inverting output terminals $\overline{Q}n$ of the down counters 37 and 33, while low level signals appear at the non-inverting output terminals Qn. Accordingly, the transistor 38 is turned on during the counting operation, and an electric current flows through the primary winding of the ignition coil 25. When the counted value comes to the set value, namely when the output value of the down counter 37 is changed to zero, the signal at the output terminal $\overline{Q}n$ is changed to a low level signal [shown in FIG. 4-(D)] and the transistor 38 is turned off. Accordingly, at this point sparks are generated in a gap of the spark plug 19 to effect ignition. Simultaneously, the signal of the output terminal Qn of the down counter 37 is changed to a high level signal and the flip-flop 36 is reset. Accordingly, the down counter 37 is turned into the non-counting state.

When the engine is in the normal operating condition, since the terminal voltage of the battery 23 is not extremely decreased, the power source voltage for the respective circuits such as for the digital computer 34 and the like, can easily be maintained at a desired level of 5 V by using the simple voltage regulator 27 which consists of a zener diode. However, at the time of starting the engine, since a large current flows into the starter motor 30, the terminal voltage is extremely reduced. Accordingly, the voltage regulator 27 which has no ability to elevate the voltage, cannot supply a power source voltage of 5 volts to the respective circuits. In general, integrated circuits of a bipolar semiconductor, P-type MOS and N-type MOS cannot be operated when the supply voltage is reduced extremely lower than 5 volts. Accordingly, in the apparatus according to the present invention, the ignition timing is not calculated by using the digital computer 34 at the time of starting the engine, but the ignition timing is controlled according to the fixed spark-advance angle predetermined irrespective of the condition of the engine. Furthermore, the circuit to be used for this control is formed of a C-MOS so that the operation of the circuit is possible even when the supply voltage is drastically decreased.

Referring to FIG. 2, when the starter switch 29 is closed and the starter motor 30 is actuated, the transistor 28 is turned on to energize the electromagnetic relay 26, whereby the movable contact 26a is connected to the contact 26c. Accordingly, at the time of starting the engine, the control input of the transistor 38, namely the ignition timing control signal, is supplied from the down counter 33 [FIG. 4-(E)]. As described hereinbefore, each of the down counter 33, R-S flip-flop 32 and frequency multiplier circuit 31 is composed of a C-MOS. Accordingly, even if the supply voltage is reduced to about 3 V, normal operation of the ignition control can be performed.

The down counter 33 is arranged so that the set value thereof is a predetermined value. For example, when the fixed spark-advance angle is 10°, the set value is 220 [=(120°−10°)/0.5]. It must be noted, however, that the above-mentioned relationship is applicable where the ignition timing standard point appears at every 120° and the clock pulse of the down counter 33 corresponds to a 0.5° crank angle.

Other structures and operations of the down counter 33 and flip-flop 32 are the same as those of the down counter 37 and flip-flop 36, respectively.

Since at the time of starting the engine the ignition timing is controlled based on the fixed spark-advance angle by the C-MOS type down counter 33 and the flip-flop 32, no trouble or inconvenience is brought about even if the power source voltage is drastically lowered.

When starting of the engine is completed and the starter switch 29 is turned off, the transistor 28 is also turned off to deenergize the electromagnetic relay 26. Accordingly, from that time on the ignition timing is controlled by the output of the down counter 37 in the above-mentioned manner.

Figure 6:
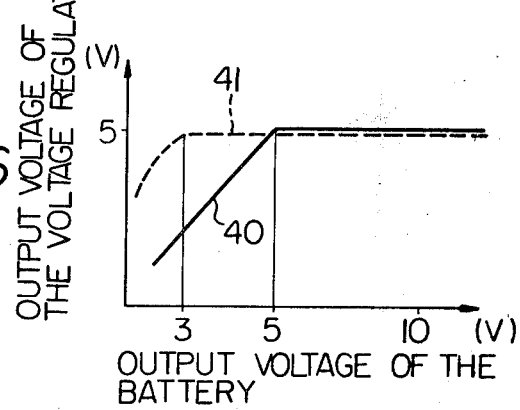
FIG. 6 is a graph of an output voltage of a voltage regulator versus an output voltage of a battery.

As will be apparent from the foregoing illustration, in the apparatus according to the present invention, the digital computer is used only when the terminal voltage of the battery is relatively constant, namely when the starter motor is not actuated. Therefore, this digital computer need not be constructed by using an expensive C-MOS. Furthermore, a simple structure having characteristics as shown by the solid line 40 in FIG. 6, for example, a combination of a zener diode and a resistor, may be conveniently used as the voltage regulator, and a D.C. converter performing a voltage-elevating operation as shown by the broken line 41 in FIG. 6 need not be used at all. Accordingly, the total cost of the control apparatus can be remarkably lowered, and the size of the control apparatus can be remarkably reduced.

In the foregoing embodiment, the engine rotational speed signal and the intake manifold vacuum level signal are used as signals for indicating the condition of the engine for calculation of the ignition timing. In the present invention, the signal indicating the quantity of air sucked into the engine may be used in combination with the engine rotational speed signal.

As many widely different embodiments of the present invention may be made without departing from the spirit and scope of the present invention, it should be understood that the present invention is not limited to the specific embodiments described in this specification except as defined in the appended claims.

What is claimed is:

1. An ignition control apparatus for an internal combustion engine having a power supply, cylinders, and spark plugs each of which is mounted on each of said cylinders, comprising:

a signal generating means for generating electrical signals which indicate the conditions of said engine;

a first electrical circuit, which would be inoperable at low voltages from the power supply which may occur at the time of starting the engine, for calculating ignition timing of each of said spark plugs in response to the value of said electrical signals, and for generating a control signal based on said calculated ignition timing;

a second electrical circuit for generating a control signal based on ignition timing of a fixed spark-advance angle, said second electrical circuit comprising a C-MOS type electrical circuit which is operable at low voltages from the power supply which may occur at the time of starting the engine;

a third electrical circuit for controlling the timing of sparks produced by said spark plugs in response to the value of a control signal provided from either one of said first electrical circuit and said second electrical circuit; and a switching means which is automatically changed over and controlled for applying said control signal from said second electrical circuit to said third circuit at the time of starting said engine and for applying said control signal from said first electrical circuit to said third circuit during periods of operation of the engine other than at the time of starting the engine.

2. An ignition control apparatus as claimed in claim 1, wherein said first electrical circuit comprises a digital computer which is programmed to calculate said ignition timing from an algebraic function or functions describing a desired relationship between said conditions of said engine and said ignition timing.

3. An ignition control apparatus as claimed in claim 1 for an internal combustion engine, wherein said power supply comprises a battery, wherein said second electrical circuit has an electrical power input terminal connected directly to said battery.

4. An ignition control apparatus as claimed in claim 1, wherein said second electrical circuit comprises a C-MOS type down counter for counting a number of applied clock pulses whose frequency is proportional to the rotational speed of said engine, a preset value of said down counter being controlled to a predetermined value, and a C-MOS type flip-flop for controlling the counting operation time of said down counter.

* * * * *

UNITED STATES PATENT AND TRADEMARK OFFICE
CERTIFICATE OF CORRECTION

PATENT NO. : 4,178,893
DATED : December 18, 1979
INVENTOR(S) : Keiji Aoki

It is certified that error appears in the above-identified patent and that said Letters Patent are hereby corrected as shown below:

Item [30] - Foreign Application Priority Data should read as follows:

-- Jul. 19, 1977 [JP] Japan .......... 52-85568 --.

Signed and Sealed this

Fifteenth Day of April 1980

[SEAL]

Attest:

SIDNEY A. DIAMOND

Attesting Officer     Commissioner of Patents and Trademarks